United States Patent [19]
Hayashi et al.

[11] Patent Number: 4,697,825
[45] Date of Patent: Oct. 6, 1987

[54] ANTI-LOCK BRAKING SYSTEM FOR THE FRONT WHEEL OF A MOTORCYCLE

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 783,348

[22] Filed: Oct. 1, 1985

[30] Foreign Application Priority Data

Nov. 6, 1984 [JP] Japan .............................. 59-233967

[51] Int. Cl.⁴ ...................... B60G 21/00; B62K 25/08
[52] U.S. Cl. .................................... 280/703; 188/292; 188/344; 188/181 A; 280/276; 303/113
[58] Field of Search ................ 280/703, 276; 180/275, 180/274, 276, 219; 188/272, 2 A, 181 T, 181 A, 181 R, 344, 299, 24.11, 271, 275, 300; 303/112, 100, 113-119; 267/64.12

[56] References Cited

U.S. PATENT DOCUMENTS

| | | |
|---|---|---|
| Re. 31,387 | 9/1983 | Bayliss ................................. 303/115 |
| 2,818,244 | 12/1957 | Ropar ..................................... 264/1 |
| 2,920,924 | 1/1960 | Reswick et al. ..................... 303/24 |
| 2,954,237 | 9/1960 | Sampietro ........................... 280/703 |
| 3,046,060 | 7/1962 | Stager et al. ........................ 303/21 |
| 3,403,761 | 10/1968 | Rockwell ............................ 188/265 |
| 3,537,715 | 11/1970 | Gualdoni ....................... 280/703 X |
| 3,655,016 | 4/1972 | Watanabe ...................... 188/2 A X |
| 3,667,816 | 6/1972 | Harned ................................ 303/21 |
| 3,731,767 | 5/1973 | Lefort ............................... 188/72.2 |
| 3,829,166 | 8/1974 | Von Loewis of Menar et al. ................................... 303/21 CG |
| 3,989,261 | 11/1976 | Kawaguchi ................... 188/272 X |
| 4,036,331 | 7/1977 | Hayashi et al. ................... 188/187 |
| 4,046,427 | 9/1977 | Baynes et al. ..................... 303/115 |
| 4,159,123 | 6/1979 | Petty ............................. 188/272 X |
| 4,260,201 | 4/1981 | Farr .................................... 303/99 |
| 4,281,881 | 8/1981 | Mekosh et al. .................... 303/99 |
| 4,340,258 | 7/1982 | Farr ................................... 303/115 |
| 4,350,396 | 9/1982 | Mortimer .......................... 303/115 |
| 4,353,440 | 10/1982 | Farr .............................. 188/181 A |
| 4,354,715 | 10/1982 | Farr et al. ......................... 303/116 |
| 4,355,849 | 10/1982 | Wilson ............................. 303/116 |

(List continued on next page.)

FOREIGN PATENT DOCUMENTS

| | | |
|---|---|---|
| 55-14295 | 4/1980 | Japan . |
| 55-45421 | 11/1980 | Japan . |
| 56-120440 | 9/1981 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 2069641A | 8/1981 | United Kingdom . |
| 2069642 | 8/1981 | United Kingdom ........... 188/181 A |
| 2070166A | 9/1981 | United Kingdom . |
| 2088993 | 6/1982 | United Kingdom ................ 280/703 |
| 2109494A | 6/1983 | United Kingdom . |

OTHER PUBLICATIONS

SAE Technical Series 830484, pp. 1–8, "Performance of Antilock Brakes with Simplified Control Technique", by Makoto Satoh & Shuji Shiraishi, 1983.
SAE Section 5: Technical Sessions, pp. 903–909, "Performance of a Simplified Control Technique for Antilock Brakes", by Makoto Satoh & Shuji Shiraishi, 1983.

Primary Examiner—Douglas C. Butler
Attorney, Agent, or Firm—Lyon & Lyon

[57] ABSTRACT

An anti-lock brake system employing an anti-lock control unit between a brake master cylinder and a front wheel brake. The brake system is applied to a damped telescopic front fork and includes an anti-dive device which operates to increase damping force upon application of braking force to the front brake. In a first embodiment, the anti-dive device operates from hydraulic pressure upstream of the anti-lock brake unit. In a second embodiment, reaction force to braking of the wheel is sensed and employed to actuate the anti-dive device.

8 Claims, 9 Drawing Figures

U.S. PATENT DOCUMENTS

| | | | |
|---|---|---|---|
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |
| 4,387,934 | 6/1983 | Farr | 303/116 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,422,695 | 12/1983 | Farr | 303/115 |
| 4,428,624 | 1/1984 | Farr | 303/116 |
| 4,437,678 | 3/1983 | Schultz | 280/703 X |
| 4,456,309 | 6/1984 | Rath | 303/10 |
| 4,456,310 | 6/1984 | Hayashi et al. | 303/119 |
| 4,457,563 | 7/1984 | Farr | 303/92 |
| 4,474,413 | 10/1984 | Farr | 303/116 |
| 4,475,774 | 10/1984 | Davis | 303/112 |
| 4,515,384 | 5/1985 | Honma et al. | 280/276 |
| 4,552,373 | 11/1985 | Kawaguchi et al. | 280/703 X |
| 4,572,317 | 2/1986 | Isono et al. | 280/703 X |

ANTI-LOCK BRAKING SYSTEM FOR THE FRONT WHEEL OF A MOTORCYCLE

BACKGROUND OF THE INVENTION

The field of the present invention is anti-lock brake systems for motorcycles.

Anti-lock braking systems for the front wheel of a motorcycle have been developed which include a master cylinder which may be actuated by the operator, a front wheel brake operated by the master cylinder through a brake line therebetween and an anti-lock control unit interposed in the brake line between the master cylinder and the front wheel brake. The anti-lock control unit is adapted to sense the nearly-locked condition of a front wheel and shut off the hydraulic pressure to the brake itself. One such braking system is disclosed in Japanese Patent Laid-open Publication No. 120440/1981.

With the motorcycle provided with such an anti-lock braking system, the chassis may vibrate when the front wheel brake is applied. This vibration occurs in a vertical direction with the repeated operation of an anti-lock control unit which rapidly cycles the brake on and off under conditions of approaching wheel lock. The problem is aggregated with motorcycles having high centers of gravity and short wheel bases.

The reaction of the front fork responsive to the action of braking and of the anti-lock braking device is to begin to dive. As the dive commences, a short period of time exists where there is no increase of the front wheel load on the tire contact with the ground. Consequently, there is no increase in the resistance to locking of the brake during that short period. Consequently, a slight decrease in braking efficiency could theoretically be experienced.

SUMMARY OF THE INVENTION

The present invention is directed to an anti-lock braking system employing an anti-dive device with a damped telescopic front suspension. The anti-dive device is responsive to the brake force applied to the front wheel. The cooperation may be achieved by tapping hydraulic pressure downstream of the anti-lock control unit or by sensing and applying the actual reaction to braking force of the front wheel.

Accordingly, it is an object of the present invention to provide an anti-lock brake system having anti-dive characteristics. Other and further objects and advantages will appear hereinafter.

BRIEF DESCRIPTION OF THE DRAWINGS

FIGS. 1-7 illustrate a first embodiment of the present invention, wherein:

DETAILED DESCRIPTION OF THE PREFERRED EMBODIMENT

The embodiments of the present invention will now be described.

Figure 1:
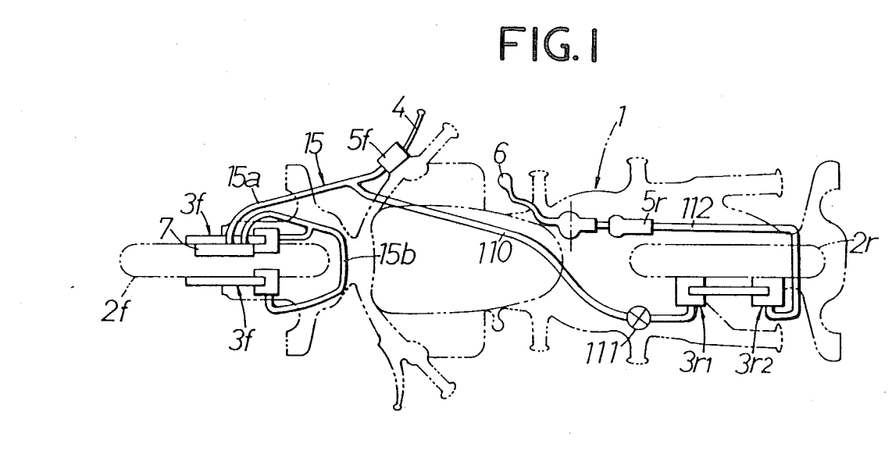
FIG. 1 is a schematic plan of a motorcycle provided with an anti-lock braking system on a front wheel.

First, referring to FIG. 1 which shows a first embodiment of the present invention, a motorcycle 1 is provided with left and right front wheel brakes $3f$, $3f$ for braking a front wheel $2f$, and first and second rear wheel brakes $3r_1$, $3r_2$ for braking a rear wheel $2r$. Both of the front wheel brakes $3f$, $3f$ and the first rear wheel brake $3r_1$ are operated by an output hydraulic pressure from a front master cylinder $5f$ which is operated by a brake lever 4, and the second rear wheel brake $2r$ by an output hydraulic pressure from a rear master cylinder $5r$ which is operated by a brake pedal 6. Especially, the hydraulic braking pressure for the front wheel brakes $3f$, $3f$ is controlled by an anti-lock control unit 7.

Figure 2:
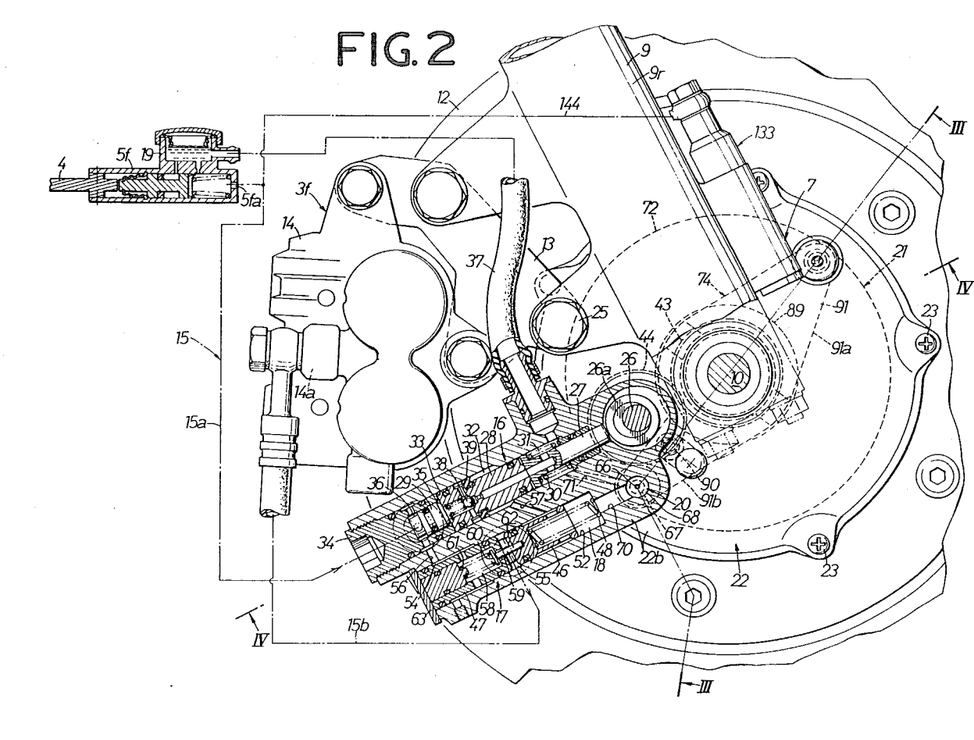
FIG. 2 is a sectioned side elevation of a principal portion of the anti-lock braking system.
Figure 3:
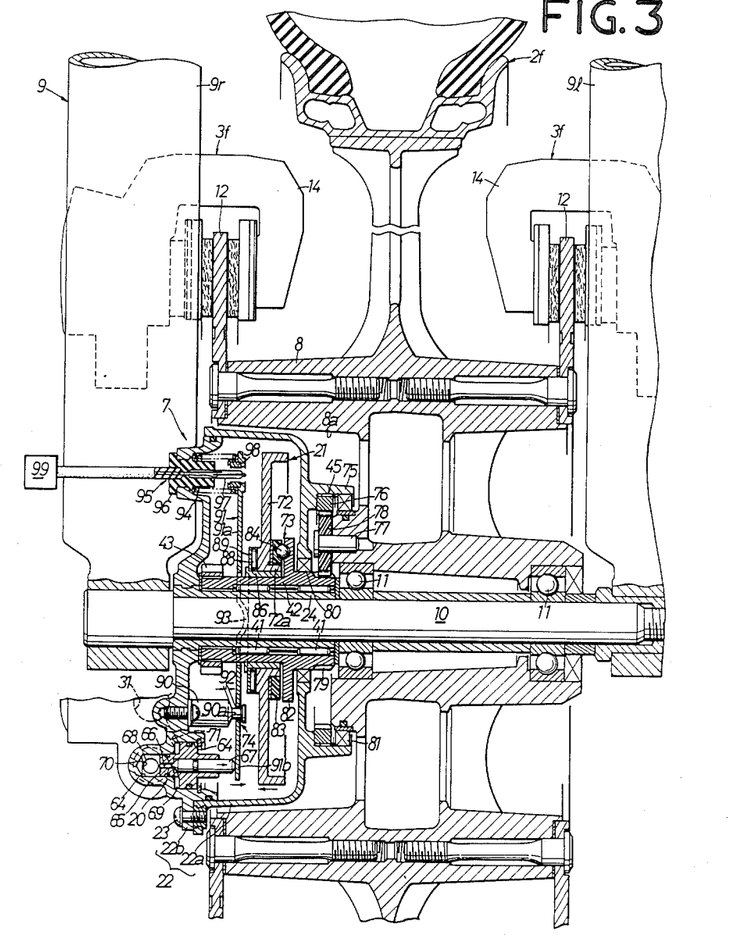
FIGS. 3 and 4 are sectional views taken along the lines III—III and IV—IV, respectively, in FIG. 2.

Referring to FIGS. 2 and 3, a hub 8 of the front wheel $2f$ is supported via bearings 11, 11 on an axle 10 which is supported at its both ends on the lower ends of left and right telescopic fork members $9l$, $9r$ constituting a front fork 9. Each of the two front wheel brakes $3f$, $3f$, which are provided on both sides of the front wheel $2f$, consists of a brake disc 12 attached to an end surface of the hub 8, and brake caliper 14 supported on the front fork 9 via a bracket 13 in such a manner that the brake caliper 14 straddle the brake disc 12. The brake caliper 14 is adapted to be operated when an output hydraulic pressure is supplied from the master cylinder $5f$ into an input port $14a$ thereof, thereby being rendered capable of holding the brake disc 12 firmly from both sides thereof to apply braking force to the front wheel $2f$.

The anti-lock control unit 7 is provided in a hydraulic pipe 15 by which an output port $5fa$ of the front master cylinder $5f$ and the input port $14a$ of each of the brake calipers 14 are connected.

The anti-lock control unit 7 consists mainly of a hydraulic pump 16 adapted to be driven by the front wheel $2f$ when braking, a modulator 17 having a hydraulic control chamber 18, into which the discharge pressure from the hydraulic pump 16 is introduced, and provided in an intermediate portion of the hydraulic pipe 15, a normally-closed pressure discharge valve 20 provided in a communication passage between the hydraulic control chamber 18 and an oil tank 19, and an inertial sensor 21 adapted to detect the nearly-locked condition of the front wheel $2f$ and open the pressure discharge valve 20. These main constituent parts are arranged in a casing 22.

The casing 22 is formed of a cup-shaped case member $22a$, and a cover member $22b$ fitted into an open end of the case member $22a$ and fixed thereto with screws 23. The case member $22a$ is provided so that it is held in a recess $8a$ formed in one end surface of the hub 8. The cover member $22b$ is supported on the axle 10 via a hollow shaft 24 provided fixedly in the central portion thereof, and joined to the front fork 9 via a rotation-preventing means so that the case member $22b$ does not turn around the axle 10. The rotation-preventing means may consist of an arbitrarily-selected part; it suitably consists, for example, of the bolts 25 (refer to FIG. 2) by which the bracket 13 is secured to the front fork 9.

The hydraulic pump 16 consists of a cam shaft 26 provided in parallel with the axle 10, a push rod 27 provided so as to oppose its inner end to an eccentric cam 26a formed on the cam shaft 26, a pump piston 28 contacting the outer end of the push rod 27, an operating piston 29 contacting the outer end of the pump piston 28, and a return spring 30 urging the push rod 27 in the direction in which the push rod 27 is apart from the eccentric cam 26a.

The push rod 27 and pump piston 28 are fitted slidably in a first cylindrical bore 33 formed in the cover member 22b, so as to define an inlet chamber 31 and an outlet chamber 32 on the outer side of the outer circumferential surfaces thereof, respectively. A plug 34 is fitted fixedly into the outer end portion of the first cylindrical bore 33 so that a pump chamber 35 is defined between the plug 34 and pump piston 28. The operating piston 29 is fitted slidably in the plug 34 so as to define a hydraulic chamber 36 therein.

The inlet chamber 31 is communicated with the oil tank 19 via a pipe 37, and with the pump chamber 35 via a suction valve 38, the pump chamber 35 being communicated with the outlet chamber 32 via a one-way seal member 39 having the function of a discharge valve. The hydraulic chamber 36 is connected to an upstream member 15a of the hydraulic pipe 15 so as to be communicated constantly with an output port 5fa in the front master cylinder 5f.

Figure 4:
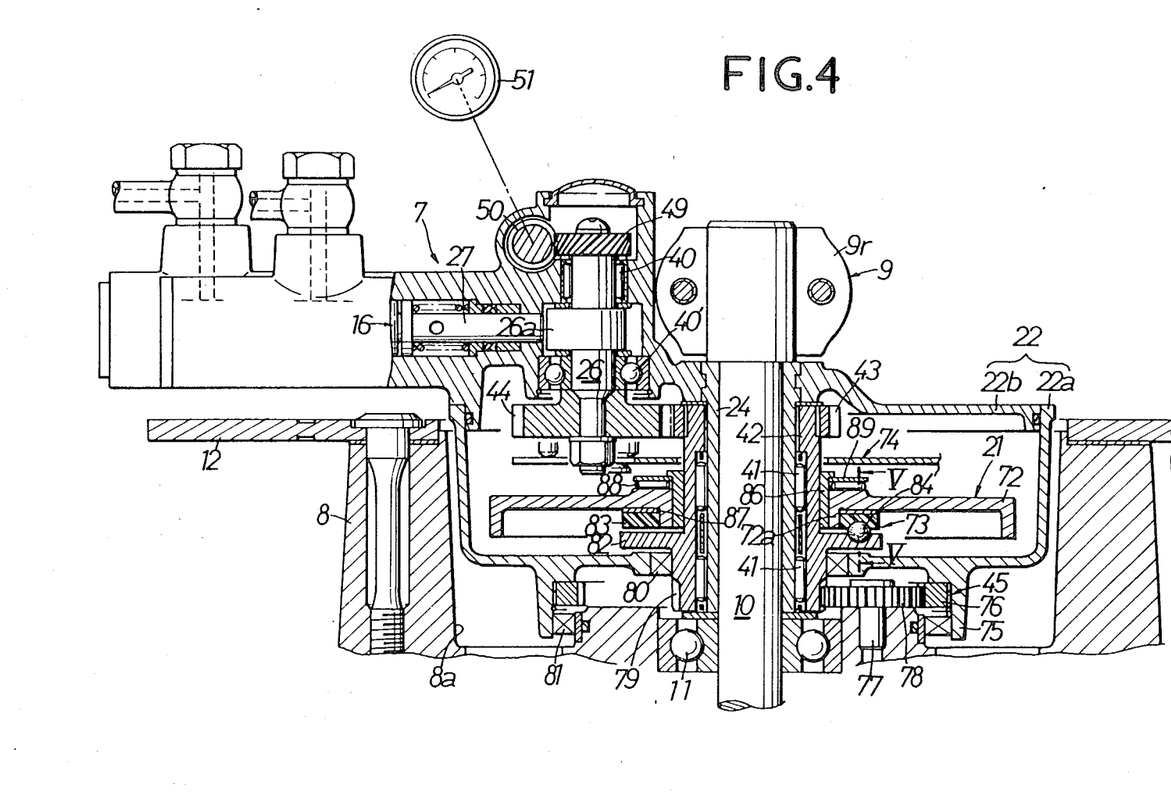

As shown in FIG. 4, the cam shaft 26 is supported on the cover member 22b via bearings 40, 40', and adapted to be driven via a pair of gears 43, 44 by a driving shaft 42 which is supported rotatably on the hollow shaft 24 via bearings 41, 41. The driving shaft 42 is adapted to be driven by the front wheel 2f via a speedup gear 45, which will be described later.

A meter driving gear 49 is mounted fixedly on an outer end portion, which is on the opposite side of the gear 44, of the cam shaft 26, and meshed with a driven gear 50 which is connected to an input shaft of a speedometer 51 on the motorcycle.

The modulator 17 consists of a pressure reduction piston 46, a fixed piston 47 receiving one end of the reduction piston 46 to limit the backward movement thereof, and a return spring 48 urging the piston 46 in the direction in which the piston 46 engages with the fixed piston 47. Both of these pistons 46, 47 are fitted slidably in a second cylindrical bore 52 which is formed in the cover member 22b so that the second cylindrical bore 52 is adjacent to the first cylindrical bore 33.

In the second cylindrical bore 52, the reduction piston 46 defines a hydraulic control chamber 18 between itself and the inner end wall of the bore 52, and a hydraulic output chamber 55 between itself and the fixed piston 47. The fixed piston 47 defines a hydraulic input chamber 54 on the outer side of the outer circumferential surface thereof. This hydraulic chamber 54 communicates with the chamber 36 in the hydraulic pump 16 via an oil passage 56. The hydraulic output chamber 55 is connected to a downstream pipe 15b of the hydraulic pipe 15 so as to be communicated constantly with the input ports 14a of the front wheel brakes 3f, 3f. The hydraulic control chamber 18 is communicated with the outlet chamber 32 in the hydraulic pump 16 via an oil passage 57.

The fixed piston 47 is provided with a valve chamber 58 communicated constantly with the hydraulic input chamber 54, and a valve port 59 by which the valve chamber 58 is communicated with the hydraulic output chamber 55. The valve chamber 58 is provided therein with a valve body 60 capable of opening and closing the valve port 59, and a valve spring 61 urging the valve body 60 toward the closed position. A valve rod 62 for opening the valve body 60 projects from one end surface of the reduction piston 46. This valve rod 62 keeps the valve body 60 open when the reduction piston 46 is in a limit position of the backward movement thereof.

The outer, open portion of the second cylindrical bore 52 is closed by an end plate 63 fixed to the cover member 22b. The fixed piston 47 is kept constantly in engagement with the end plate 63, because of the resilient force of the return spring 48 or the hydraulic pressure introduced into the hydraulic input and output chambers 54, 55.

The hydraulic pump 16 and modulator 17 are disposed on the rear side of the front fork 9 in the same manner as the brake caliper 14.

The pressure discharge valve 20 consists of a valve seat member 65 fitted firmly in a stepped cylindrical bore 64 in the cover member 22b, and a valve body 67 fitted slidably in the valve seat member 65 so as to open and close a valve port 66 thereof. The valve seat member 65 defines an inlet chamber 68 in a smaller-diameter portion of the stepped cylindrical bore 64, and an outlet chamber 69 in a larger-diameter portion thereof, these chambers 68, 69 being communicated with each other via the valve port 66. The inlet chamber 68 is in communication with the hydraulic control chamber 18 in the modulator 17 via the oil passage 20. The outlet chamber 69 is in communication with the inlet chamber 31 in the hydraulic pump 16 via an oil passage 71. Consequently, the outlet chamber 69 is in communication with the oil tank 19.

The sensor 21 consists of a speedup gear 45 into which power is input from the front wheel 2f, a flywheel 72 adapted to be rotated by the speedup gear 45, a cam means 73 for converting overrun rotation of the flywheel 72 into axial displacement, and an output lever means 74 capable of operating the pressure discharge valve 20 in accordance with the axial displacement of the flywheel 72. The speedup gear 45 is provided on the outer side of a rear wall of the case member 22a. The cam means 73, flywheel 72 and output lever means 74 are on the inner side of the case member 22a.

The speedup gear 45 has a planetary gear construction, and consists of a ring gear 76, which is pline-fitted on the inner circumferential surface of an annular support portion 75 projecting from the outer surface of the rear wall of the case member 22a, a plurality of planetary gears 78 supported rotatably 77 on the hub 8 and meshed with the ring gear 76, and a sun gear 79 formed at one end portion of the driving shaft 42 and meshed with the planetary gears 78.

A seal member 80 is inserted between the rear wall of the case member 22a and the driving shaft 42 extending therethrough. A seal member 81 is also inserted between the annular support portion 75 of the case member 22a and the hub 8.

In order to prevent the rotation of the front wheel 2f from being hindered if an overload is applied to the driving shaft 42, at least one of the constituent gears of the speedup gear 45, for example, the planetary gear 78, is made of a synthetic resin having a safety function like that of a fuse in that it breaks when torque on that gear exceeds a predetermined level.

The speedometer 51 is operatively connected to the driving shaft 42 which is driven by the speedup gear 45. Accordingly, if the gear 78 which is made of a synthetic resin should be broken, the speedometer stops operating in spite of the rotation of the front wheel 2f, so that the rider can therefore learn the occurrence of this accident.

Figure 5:
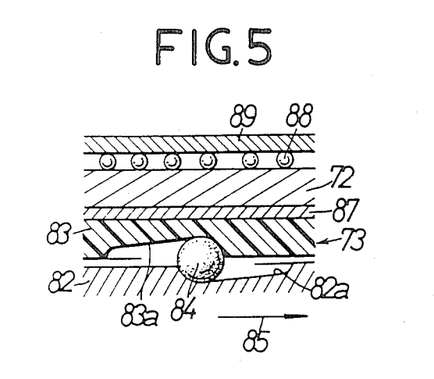
FIG. 5 is an enlarged sectional view taken along the line V—V in FIG. 4.

The cam means 73 consists, as shown in FIG. 5, of a driving cam plate 82 fixed to the driving shaft 42, a driven cam plate 83 provided in opposition to the driving cam plate 82 so that the driven cam plate 83 can be rotated relatively thereto, and a thrust ball 84 engaged with cam recesses 82a, 83a in the opposite surfaces of the cam plates 82, 83. The cam recess 82a in the driving cam plate 82 is inclined so that the bottom surface of the recess 82a is shallower in the rotational direction 85 of the driving shaft 42. The cam recess 83a in the driven cam plate 83 is inclined so that the bottom surface of the recess 83a is deeper in the rotational direction 85 mentioned above. Accordingly, in a normal case where the driving cam plate 82 takes the driving position with respect to the driven cam plate 83, the thrust ball 84 engages the deepest portions of the cam recesses 82a, 83a, and the rotary torque received by the driving cam plate 82 from the driving shaft 42 is simply transmitted to the driven cam plate 83, so that the relative rotation of the cam plates 82, 83 does not occur. When the position of the driving cam plate 82 is reversed, i.e., when the driven cam plate 83 overruns the driving cam plate 82, the cam plates 82, 83 rotate relatively to each other. Consequently, the thrust ball 84 rolls in a climbing manner on the inclined bottom surfaces of the cam recesses 82a, 83a to apply thrust to these cam plates 82, 83 and cause the driven cam plate 83 to be displaced axially, i.e., in the direction in which the driven cam plate 83 is removed from the driving cam plate 82.

In order to lessen the impact occurring when the thrust ball 84 suddenly reaches the rolling limit in the cam recesses 82a, 83a, at least one of the constituent elements of the cam means 73 is made of a synthetic resin. In the illustrated embodiment, the driven cam plate 83 and the thrust ball 84 are made of a synthetic resin. This prevents vibration of the cam means 73, which is caused by such an impact, thereby proving the durability thereof.

The flywheel 72 is supported rotatably and slidably at its boss 72a on the driving shaft 42 via a bushing 86. The driven cam plate 83 is supported rotatably on the boss 72a, and engages one side surface of the flywheel 72 via a friction clutch plate 87. A pressure plate 89 is provided on the other side surface of the flywheel 72 via a thrust bearing 88.

The output lever means 74 has a support shaft 90 projecting from the portion of the inner surface of the cover member 22b which is between the axle 10 and pressure discharge valve 20, and a lever 91 supported on a neck portion 90a of a free end section of the support shaft 90 so that the lever 91 can be moved pivotally in the axial direction of the axle 10. A clearance 92 of a predetermined width extending in the pivoting direction of the lever 91 is provided between the neck portion 90a and lever 91. The lever 91 consists of a first longer arm 91a extending from the support shaft 90 to extend around the driving shaft 42, and a second shorter arm extending toward the pressure discharge valve 20.

The first arm 91a is provided at an intermediate point with a contact portion 93 to engage the outer surface of the pressure plate 89. The contact portion 93 has a rounded projection toward the outer surface of the pressure plate.

A spring 94 is provided between a free end portion of the first arm 91 and the cover member 22b. A free end portion of the second arm 91b engages the outer end of the valve body 67 in the pressure discharge valve 20.

The resilient force of the spring 94 is applied to the lever 91 to press the contacting portion 93 of the first arm 91a against the pressure plate 89, and normally serves to press the valve body 67 in the pressure discharge valve 20 to thereby keep the valve 20 closed. The pressure received by the pressure plate 89 from the spring 94 generates the frictional locking force in three parts, i.e. the flywheel 72, friction clutch plate 87 and driven cam plate 83, and such force in the two cam plates 82, 83 that causes them to move toward each other.

When rotary torque which exceeds a predetermined value is applied between the driven cam plate 83 and flywheel 72, the above-mentioned frictional locking force is set so that slip occurs on the friction clutch plate 87.

A detecting unit 95 for detecting normal operation of the output lever means 74 is connected thereto. This detecting unit 95 consists of a switch holder 96 held firmly in the cover member 22b and projecting into a coiled portion of the spring 94, a lead switch 97 supported on the switch holder 96 in the coiled portion of the spring 94, and a permanent magnet 98 attached to the first arm 91a so as to be opposed to the lead switch 97. When the first arm 91a is turned at a predetermined angle toward the cover member 22b, the permanent magnet 98 is displaced to a position in which the lead switch 97 is closed.

Figure 6:
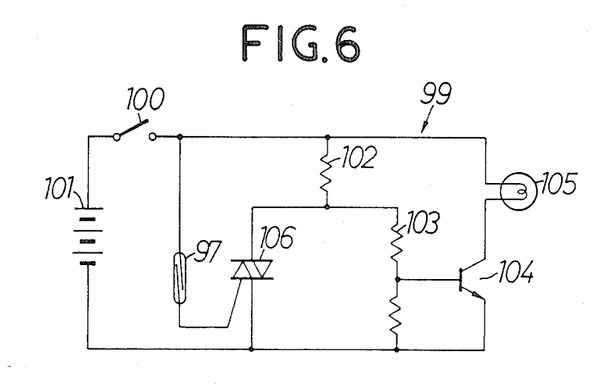
FIG. 6 is a wiring diagram of a display circuit in FIG. 2.

A display circuit 99 is connected to the lead switch 97. The display circuit 99 is formed as shown in FIG. 6. When a main switch 100 is closed, an electric current flows from a power source 101 to the base of a transistor 104 through the main switch 100 and resistors 102, 103, so that the transistor 104 is turned on. Consequently, a display lamp 105 is turned on through the main switch 100 and kept lit. When the permanent magnet 98 is then displaced to the lead switch 97 to close the same, an electric current flows to the gate of a thyrister 106 through the lead switch 97. As a result, the thyrister 106 is turned on, and the electric current passing through the resistor 102 flows to the thyrister 106, so that the transistor 104 is turned off with the display lamp 105 then turned off. Accordingly, it can be detected by the interruption of the ON-state of this display lamp 105 that the lever 91 has been turned to the side of the cover member 22b against the resilient force of the spring 94. Even when the lever 91 is then returned to its original position to open the lead switch 97, the OFF-state of the display lamp 105 is retained by the thyrister 106 until the main switch 100 has been opened and then closed again.

An ignition switch or a braking switch for a motorcycle can be used as the main switch.

Returning to FIG. 1 again, an interconnecting pipe 110 branching from the intermediate portion, which is between the front master cylinder 5f and anti-lock control unit 7, of the hydraulic pipe 15, i.e. the upstream pipe 15a is connected to the input port of the first rear wheel brake $Br_1$, and a proportional reducing valve 111 is provided in the intermediate portion of the interconnecting pipe 110. This proportional reductive valve 111 is a valve known in the art which is adapted to reduce the hydraulic output pressure from the front master cylinder 5f when this pressure has exceeded a predetermined level, and to transmit the resultant hydraulic pressure to the first rear wheel brake 2r₁.

A hydraulic pipe 112, which extends from the output port of the rear master cylinder 5r, is connected to the input port of the second rear wheel brake Br₂. Accordingly, the second rear wheel brake Br₂ is operated only when the rear master cylinder 5r is actuated.

While the vehicle runs, the driving shaft 42 is driven at an increased speed due to the rotational force transmitted from the front wheel 2f thereto via the speedup gear 45, and the flywheel 72 is then driven via the cam means 73 and friction clutch plate 87, so that the flywheel 72 is rotated at a higher speed than the front wheel 2f. Therefore, the flywheel 72 has a large rotary inertial force.

At the same time that the flywheel is rotated, the cam shaft 26 and speedometer 51 are also driven by the driving shaft 42.

When the front master cylinder 5f is operated so as to brake the vehicle, the hydraulic output pressure therefrom is transmitted to the front wheel brakes 3f, 3f via the upstream pipe 15a of the hydraulic pipe 15, hydraulic chamber 36 in the hydraulic pump 16, hydraulic input chamber 54 in the modulator 17, valve chamber 58, valve port 59, hydraulic output chamber 55, and downstream pipe 15b of the hydraulic pipe 15 in the mentioned order. This hydraulic output pressure is also transmitted to the first rear wheel brake Br₁ via the upstream pipe 15a and interconnecting pipe 110. The front and rear wheel brakes 3f, 3f, Br₁ can thus be operated to apply braking force to the front and rear wheels 2f, 2r at once.

In the hydraulic pump 16, the hydraulic output pressure from the front master cylinder 5f is introduced into the hydraulic chamber 36. Consequently, the pump piston 28 is moved reciprocatingly due to the pressing effect of the hydraulic pressure on the operating piston 29 and the lifting effect of the eccentric cam 26a on the push rod 27. In a suction stroke in which the pump piston 28 is moved toward the push rod 27, the suction valve 38 is opened, and the oil in the oil tank 19 is sucked from the pipe 35 into the pump chamber 35 via the inlet chamber 31. In an exhaust stroke in which the pump piston 28 is moved toward the operating piston 29, the one-way seal member 39 makes a valve-opening action to cause the oil in the pump chamber 35 to flow under pressure into the output chamber 32 and then into the hydraulic control chamber in the modulator 17 via the oil passage 57. When the pressures in the output chamber 32 and hydraulic control chamber 18 have increased to a predetermined level, the pump piston 28 is held in the position, in which the pump piston 28 is engaged with the plug 34, due to the pressure in the output chamber 32.

The communication between the hydraulic control chamber 18 in the modulator 17 and the oil tank 19 is initially cut off since the pressure discharge valve 20 is closed. Accordingly, the hydraulic pressure supplied from the hydraulic pump 16 to the hydraulic control chamber 18 is applied directly to the reduction piston 46 to hold the piston 46 in the position in which the backward movement thereof is limited, and the valve body 60 is kept open by the valve rod 62 to thereby permit the passage of the hydraulic output pressure from the front master cylinder 5f.

Therefore, in the initial stage of a braking operation, the level of the braking force applied to the front wheel brakes 3f, 3f varies in proportion to that of the hydraulic output pressure from the front master cylinder 5f.

When angular deceleration occurs in the front wheel 2f during this braking operation, the flywheel 72, which senses this phenomenon, is formed to make an overrunning rotation with respect to the driving shaft 42 due to the inertial force thereof. During this time, the moment of rotation of the flywheel 72 causes the two cam plates 82, 83 to be turned relatively to each other, and the thrust occurring due to the rolling of the thrust ball 84 causes the flywheel 72 to be displaced axially, and the pressure plate 89 to press the lever 91.

The movement of the lever 91 being pressed by the pressure plate 89 will now be discussed. Since the clearance 92 exists between the support shaft 90 and lever 91, the lever is supported initially at three points, i.e., on the spring 94, pressure plate 89 and pressure discharge valve 20. When the lever 91 is pressed by the pressure plate 89, it is turned about the valve body 67 as a fulcrum. When this pivotal movement of the lever 91 has progressed to the extent that the lever 91 has attained a predetermined angle, the clearance 92 between the support shaft 90 and lever 91 is lost, and the fulcrum on the side of the second arm 91b is moved from the valve body 67 to the support shaft 90 which is closer to the contacting portion 93. As a result, the lever 91 is then turned about the support shaft 90 as a fulcrum.

The lever ratio at which the lever 91 is turned by the pressure plate 89 thus varies in two steps. Therefore, even if the resilient force of the spring 94 is constant, the lever 91 is turned initially by a comparatively low pressure from the pressure plate 89. After the fulcrum of the lever 91 with respect to the pivotal movement thereof has been moved, the lever is not turned unless the pressure from the pressure plate 89 is increased to a predetermined level. Accordingly, the lever 91 is turned by the pressure from the pressure plate 89 in the stage of a braking operation in which the angular deceleration occurring in the front wheel 2f is comparatively small, to cause the permanent magnet 98 to be moved to a position close to the closing position of the lead switch 37. Consequently, the display circuit 99 is actuated in the previously-described manner, so that the rider can ascertain that the sensor 21 is normally operated.

When the front wheel 2f is about to be locked due to the excessively large braking force or a decrease in the coefficient of friction of the road surface, the angle of deceleration of the front wheel 2f then increases suddenly. As a result, the pressure from the pressure plate 89 exceeds a predetermined level, and the lever 91 is turned about the support shaft 90 as a fulcrum so as to further compress the spring 94, so that the second arm 91b of the lever 91 is turned so as to be removed from the valve body 67. This causes the pressure discharge valve 20 to be opened.

When the pressure discharge valve 20 is opened, the hydraulic pressure in the hydraulic control chamber 18 is discharged to the oil tank 19 via the oil passage 70, inlet chamber 68, valve port 66, outlet chamber 69, oil passage 71, inlet chamber 31 in the hydraulic pump 16, and pipe 37. Therefore, the pressure reduction piston 46 is moved toward the hydraulic control chamber 18 by the hydraulic pressure from the hydraulic output chamber 55 against the resilient force of the return spring 48.

Consequently, the valve rod 62 is moved back to close the valve body 60, shut off the hydraulic input and output chambers 54, 55 from each other and increase the capacity of the hydraulic output chamber 55. In consequence, the hydraulic braking pressure applied to the front wheel brakes 3f, 3f decreases, and the braking force for the front wheel 2f decreases. This can prevent the front wheel 2f from locking. As a result, the front wheel 2f is accelerated, and the lever 91 is released from the pressure from the pressure plate 89, so that the lever 91 pivots to its original position due to the resilient force of the spring 94 to close the pressure discharge valve 20. When the pressure discharge valve 20 has been closed, the pressure oil discharged from the hydraulic pump 16 is trapped immediately in the hydraulic control chamber 18, and the reduction piston 46 is moved back toward the hydraulic output chamber 55 to increase the pressure in the chamber 55 and regain the braking force. Since such operations are repeated at a high speed, the front wheel 2f can be braked very efficiently.

Figure 7:
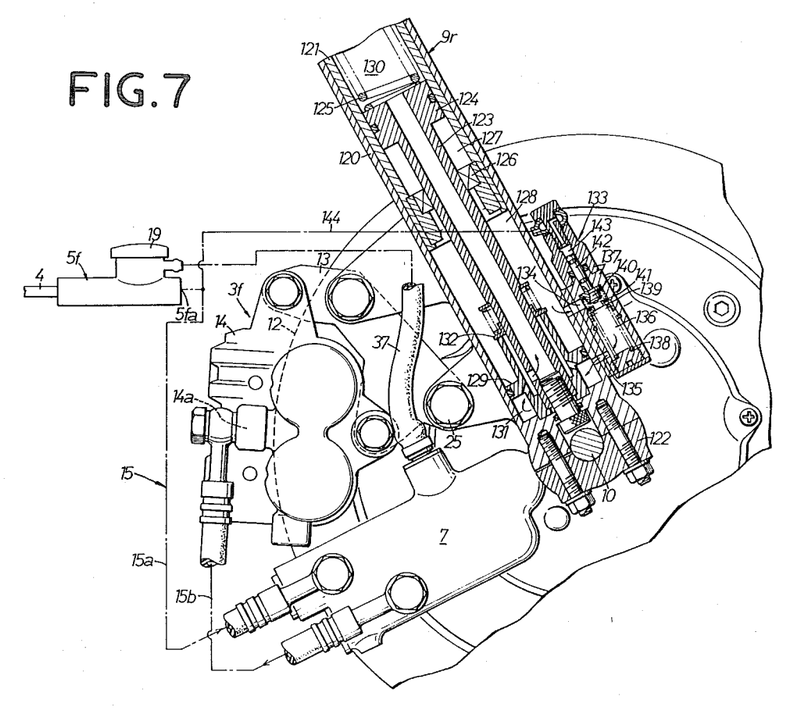
FIG. 7 is a side elevation of the anti-lock braking system with a front fork shown in section.

Referring to FIG. 7, each of the telescopic forks 9l, 9r is provided with a bottom case 120, and a fork pipe 121 fitted slidably in the bottom case 120. At the lower end of the bottom case 120, an end portion of the axle 10 is supported fixedly by a holder 122. In the interior of the bottom case 120, a seat pipe 123, which is concentric with the bottom case 120, is fitted firmly in such a manner that a piston 124 formed integrally with and at the upper end portion of the seat pipe 123 slidably engages the inner circumferential surface of the fork pipe 121. In the interior of the fork pipe 121, a suspension spring 125 is provided between the upper end portion thereof and the piston 124 so that the spring 125 urges the relative fork 9l, 9r in the extending direction thereof. A buffer valve means 126 having an orifice and a check valve is provided between the inner surface of the lower end portion of the fork pipe 121 and the outer surface of the seat pipe 123. The upper and lower hydraulic chambers 127, 128, which are communicated with each other via the buffer valve means 126, are formed around the seat pipe 123.

A partition member 129 is provided between the lower end portions of the bottom case 120 and seat pipe 123. As a result, a hydraulic relay chamber 131, which is communicated with a reserve oil chamber 130 on the inner side of the seat pipe 123 and fork pipe 121, is defined in the lowermost portion of the interior of the bottom case 120. A check valve 132, which permits the oil to flow in only one direction from the hydraulic relay chamber 131 to the lower hydraulic chamber 128, is provided on the upper portion of the partition member 129.

An anti-dive unit 133 is provided on the front surface of the lower portion of each of the telescopic forks 9l, 9r or the bottom case 120 in one of the forks 9l, 9r. This anti-dive unit 133 is provided with a housing 137 having an upper port 134 communicated with the lower hydraulic chamber 128, a lower port 135 communicated with the hydraulic relay chamber 131, and a valve chamber 136 communicating these ports 134, 135 with each other, a valve seat 139 positioned between the ports 134, 135 and held on a shoulder portion of the valve chamber 136 by a retainer spring 138, a valve body 140 held in the valve chamber 136 so as to open and close the same in cooperation with the valve seat 139, and a valve spring 141 urging the valve body 140 in the valve-open direction. The rear surface, which faces in the direction opposite the valve seat 139, of the valve body 140 is provided with a piston 142 formed integrally with the valve body 140 and extending to the outside of the valve chamber 136. This piston 142 defines a pressure receiving chamber 143 within the housing 137. This pressure receiving chamber 143 is communicated with the output port 5fa of the front master cylinder 5f via a pipe 144.

While the front master cylinder 5f is not in operation, the valve body 140 in the anti-dive unit 133 is open. When the front fork 9 starts contracting with the valve body 140 open, the pressure in the lower hydraulic chamber 128 increases, and the upper hydraulic chamber 127 is vacuumed. Accordingly, the oil in the lower hydraulic chamber 128 flows with a low flow passage resistance into the upper hydraulic chamber 127 through the check valve in the buffer valve means 126, and also into the hydraulic relay chamber 131 through the upper port 134, valve chamber 136 and lower port 135, the oil being further flowing into the reserve oil chamber 130 with substantially no resistance. As a result, a slight damping force occurs in the buffer valve means 126, and substantially no damping force in the anti-dive unit 133.

Conversely, when the front fork 9 starts extending, the pressure in the upper hydraulic chamber increases, and the lower hydraulic chamber is vacuumed. Accordingly, the oil in the upper hydraulic chamber 127 flows with a high flow passage resistance into the lower hydraulic chamber 128 through the orifice in the buffer valve means 126. At the same time, the oil in the reserve oil chamber 130 flows into the lower hydraulic chamber 128 through the hydraulic relay chamber 131, lower port 135, valve chamber 136 and upper port 134. As a result, a strong damping force occurs in the buffer valve means 126. However, substantially no damping force occurs in the anti-dive unit in the same way as in the above-mentioned case.

When the front master cylinder 5f operates to actuate the front wheel brake 3f, the output hydraulic pressure therefrom is transmitted to the pressure-receiving chamber 143 as well in the anti-dive unit 133 to press the piston 142 downward. Consequently, the valve body 140 is set on the valve seat 139, and the valve chamber 136 is closed or limitedly opened. When the front fork 9 then starts contracting, the passage of the oil in the lower hydraulic chamber 128 through the valve chamber 136 is stopped or greatly limited, so that a great damping force occurs. This enables the contraction of the front fork 9 to be suitably restricted.

Conversely, when the front fork 9 starts extending the oil in the reserve oil chamber 130 flows to open the check valve 132 and enter the lower hydraulic chamber 128 with a comparatively low pressure. Therefore, the damping force occurs in the anti-dive unit 133, and the front fork 9 extends substantially in the same manner as in the case where the master cylinder 5f is not in operation.

Figure 9:
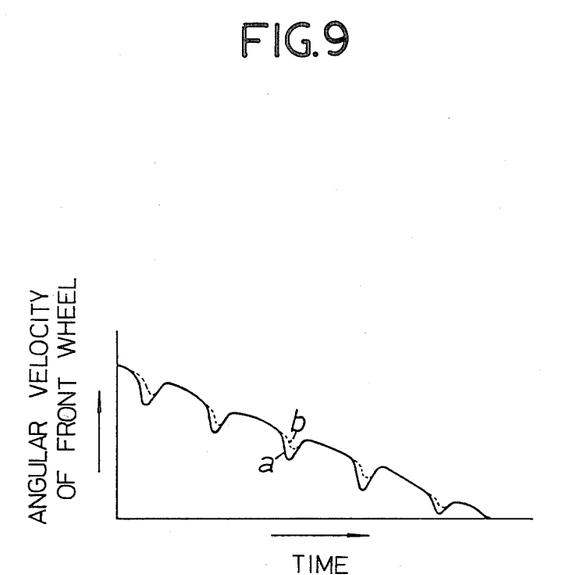
FIG. 9 is a graph showing the relation between the time and the angular velocity characteristics during the anti-lock controlling of a front wheel brake, wherein a curve a indicates the characteristics of a prior art anti-lock braking system of this kind; and a curve b the characteristics of the anti-lock braking system according to the present invention.

While the hydraulic braking pressure for the front wheel brake 3f is increased and decreased repeatedly by the anti-lock control unit 7 during an operation of the front wheel brake 3f, a downward load is applied from the chassis to the front fork 9 every time the hydraulic braking pressure is increased, to exert the contracting force thereon. However, the contracting action of the front fork 9 is suitably suppressed by the great damping force generated by the anti-dive unit 133. Accordingly, the grounding load on the front wheel 2f increases immediately to cause the frictional force generated between the front wheel 2f and the road surface to increase quickly. This enables the variations in the angular deceleration of the front wheel to be minimized as shown by a line b in FIG. 9.

Figure 8:
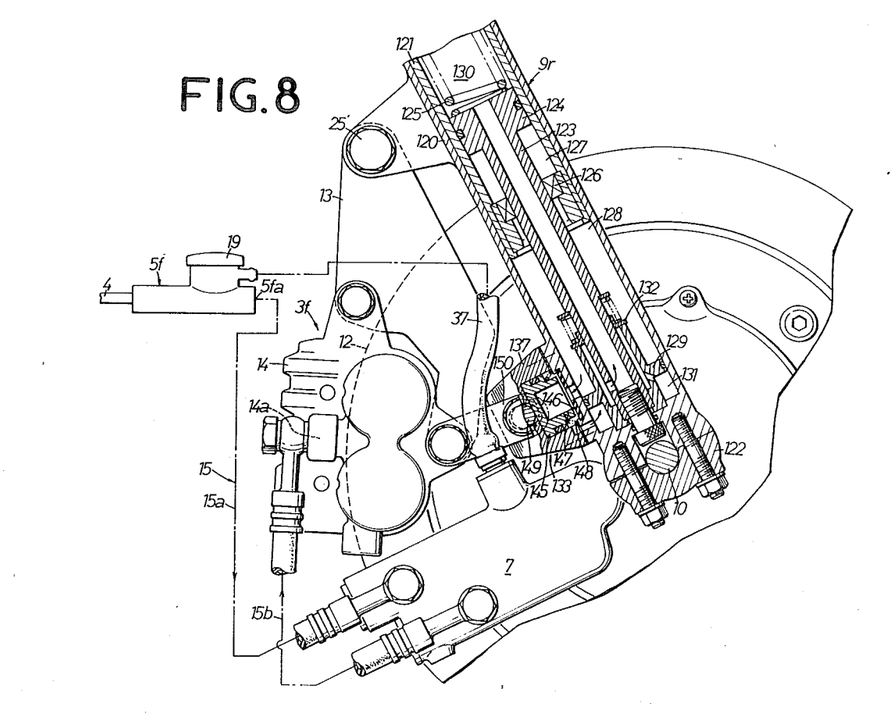
FIG. 8 is a side elevation similar to FIG. 7, showing a second embodiment of the present invention.

FIG. 8 shows a second embodiment of the present invention, in which an anti-dive unit 133 is formed of a braking torque-responding type anti-dive unit. To be more precise, a housing 137 is secured to the portion of the rear surface of a bottom case 120 which is opposed to the brake caliper 14 in a front wheel brake 3f, and a piston 145, which can be moved slidingly in the radial direction of the bottom case 120, is fitted slidably in the housing 137, an oil passage 146, which is opened and closed in accordance with the forward and backward movements of the piston 145, and which has a low flow passage resistance, being provided between the bottom case 120 and housing 137. This oil passage 146 is so provided that a lower hydraulic chamber 128 and a hydraulic relay chamber 131 are in communication with each other. An orifice 147, which shunts the portion opened and closed by and with the piston 145 of this oil passage 146, and which communicates both end portions of the same oil passage 146, is provided in the piston 145.

The housing 137 is further provided therein with a return spring 148, which urges the piston 145 in the direction in which the oil passage 146 is opened, i.e., in the direction in which the piston 145 is moved back, and an operating rod 149 capable of urging the piston 145 in the direction in which the oil passage 146 is opened, i.e., in the direction in which the piston 145 is moved forward. This operating rod 149 is connected to the brake caliper 14 in the front wheel brake 3f via a link 150. One end of a bracket 13 which supports the brake caliper 14 is connected pivotably to the bottom case 120 via a pivot 25' so that the brake caliper 14 is turned or displaced relative to the piston 145 by the braking torque when the brake caliper 14 holds a brake disc 12 therein firmly.

The construction of the remaining portion of this embodiment is substantially identical with that of the corresponding portion of the previously-described embodiment. In FIG. 8, the parts corresponding to those of the previous embodiment are designated by the same reference numerals.

While the front wheel 2f is not braking, the piston 145 in the anti-dive unit 133 is held in a retracted portion due to the resilient force of the return spring 148 to keep the oil passage 146 open. Accordingly, when the front fork 9 then extends and contracts, the oil flows with substantially no resistance between the lower hydraulic chamber 128 and hydraulic relay chamber 131 through the oil passage 146, so that the damping force does not occur in the anti-dive unit 133.

While the front wheel brake 3f is in operation, i.e., while the brake disc 12 is held firmly in the caliper 14, the brake caliper 14 is turned by the braking torque about the pivot 25' toward the piston 145. Consequently, the piston 145 moves forward via link 150 and operating rod 149 to close the oil passage 146.

Therefore, when a downward load is then applied from the chassis to the front fork 9 to cause the front fork to start contracting, the oil in the lower hydraulic chamber 128 flows with a high flow passage resistance into the hydraulic relay chamber 131 through the orifice 147, so that the strong damping force occurs therein. Owing to this damping force, the contracting action of the front fork is suitably suppressed. The suppression of such a contracting action of the front fork 9 is done every time the hydraulic braking pressure for the front brake 3f is increased by the anti-lock control unit 7 in the same manner as in the previously-described embodiment.

When the hydraulic braking pressure applied to a front wheel increases and decreases repeatedly due to an operation of an anti-lock control unit while a front wheel brake is operated, a downward load is imparted from a chassis to a front fork every time the hydraulic braking pressure increases, to cause the front fork to contract. However, since the contracting action of the front fork is restricted by an anti-dive unit, the load on the front wheel on that area of the tire which is contacting the ground increases immediately to enable the frictional force between the front wheel and the road surface to increase quickly. Accordingly, the variations in the angular deceleration of the front wheel can be minimized.

According to the present invention described above, an anti-dive unit to control the contracting action of the telescopic front fork in accordance with an operation of the front wheel brake is provided on the front wheel-supporting front fork. Therefore, the contracting action of the front fork can be suppressed by the anti-dive unit to quickly increase the grounding load on the front wheel every time the hydraulic braking pressure for the front wheel brake is increased by an anti-lock control unit. This suppresses vertical vibration of the chassis, facilitates front wheel braking, thus minimizes variations in the angular deceleration of the front wheel and improves braking efficiency.

What is claimed is:

1. An anti-lock brake system for the front wheel of a motorcycle having a damped telescopic front fork, comprising
a brake master cylinder;
a front wheel brake;
an anti-lock control unit;
a brake line between said brake master cylinder and said front wheel brake, said anti-lock control unit being interposed in said brake line between said brake master cylinder and said front wheel brake; and
an anti-dive unit on the damped telescopic front fork responsive to applied braking force downstream of said master cylinder to increase damping force responsive to braking force.

2. An anti-lock brake system according to claim 1, wherein the damped telescopic front fork comprises a first member and a second member slidably fitted on the first member to define therebetween a first chamber and a second chamber normally communicating with each other through a passage, said anti-dive unit having a normally-open valve interposed in said passage, said valve being closed when braking force is outputted from the master cylinder.

3. An anti-lock brake system according to claim 2, wherein said valve has a body normally biased toward an open position by spring means, said body having a surface for receiving hydraulic pressure from the master cylinder during braking operation, said body being, upon receipt of the hydraulic pressure, urged toward a closed position against force of the spring means.

4. An anti-lock brake system according to claim 2, wherein the front wheel brake comprises a braking force-applying member supported via a pivotal connection to a bracket means secured to a chassis, and a braking force-applied member associated with said braking force-applying member, whereas said valve of the anti-dive unit has a body normally biased toward an open position by spring means, said valve body being operatively connected with the braking force-applying member and being biased toward its closed position in accordance with a turning movement of the applying member around said pivotal connection responsive to cooperative braking operation of the applying and applied members.

5. An anti-lock brake system for the front wheel of a motorcycle having a damped telescopic front fork, comprising:
- a front wheel brake;
- a brake master cylinder providing fluid pressure to said front wheel brake;
- an anti-lock control unit comprising a means for reducing fluid pressure to said front wheel brake to avoid wheel lock;
- a brake line between said brake master cylinder and said front wheel brake, said anti-lock control unit being interposed in said brake line between said brake master cylinder and said front wheel brake; and
- an anti-dive unit on the damped telescopic front fork responsive to applied braking force downstreem of said anti-lock control unit to increase damping force when braking force is increased.

6. An anti-lock brake system according to claim 5, wherein the damped telescopic front fork comprises a first member and a second member slidably fitted on the first member to define therebetween a first chamber and a second chamber normally communicating with each other through a passage, said anti-dive unit having a normally-open valve interposed in said passage, said valve being closed when braking force is outputted from the master cylinder.

7. An anti-lock brake system according to claim 6, wherein said valve has a body normally biased toward an open position by spring means, said body having a surface for receiving hydraulic pressure from the master cylinder during braking operation, said body being, upon receipt of the hydraulic pressure, urged toward a closed position against force of the spring means.

8. An anti-lock brake system according to claim 6, wherein the front wheel brake comprises a braking force-applying member supported via a pivotal connection to a bracket means secured to a chassis, and a braking force-applied member associated with said braking force-applying member, whereas said valve of the anti-dive unit has a body normally biased toward an open position by spring means, said valve body being operatively connected with the braking force-applying member and being biased toward its closed position in accordance with a turning movement if the applying member around said pivotal connection responsive to cooperative braking operation of the aplying and applied members.

* * * * *